United States Patent [19]
Hu et al.

[11] Patent Number: 5,394,382
[45] Date of Patent: Feb. 28, 1995

[54] METHOD FOR THE ORGANIZATION OF DATA ON A CD-ROM

[75] Inventors: Limin Hu, Mount Kisco, N.Y.; Shauchi Ong, Mountain View, Calif.

[73] Assignee: International Business Machines Corporation, Armonk, N.Y.

[21] Appl. No.: 16,379

[22] Filed: Feb. 11, 1993

[51] Int. Cl.$^6$ .............................................. G11B 17/22
[52] U.S. Cl. .................... 369/32; 369/44.11; 360/73.03
[58] Field of Search .................. 369/32, 33, 44.11, 43, 369/57, 59, 54, 56; 360/73.03, 78.06, 72.1, 48, 51, 72.2, 78.01, 78.04, 40, 135

[56] References Cited

U.S. PATENT DOCUMENTS

| | | | |
|---|---|---|---|
| 4,937,803 | 6/1990 | Nakane | 369/32 |
| 4,949,323 | 8/1990 | Yoshida | 369/32 |
| 5,278,703 | 1/1994 | Rub et al. | 369/32 X |
| 5,297,124 | 3/1994 | Plotkin et al. | 369/32 |

*Primary Examiner*—Ali Neyzari
*Attorney, Agent, or Firm*—Perman & Green

[57] ABSTRACT

A data placement organization method that reduces the average seek time and the probability of maximum distance seeks of CD-ROM disks by a combination of symmetric structuring, frequency-based data placement, and data replication. The technique for fabricating a CD-ROM, including the data placement organization stage of the present invention includes a first stage wherein the data is designed, authored and prepared on a data processor or personal computer and stored on the hard disk memory. The data is then transferred from the hard disk temporary storage onto tape storage or optical disk storage. The data on the tape storage is then used as input to a CD-ROM mastering stage wherein, based on the content of the tape, holes are burned in a master CD mold which is used to press a large quantity of CDs. A data placement optimization stage is provided between the first processor stage 3 and the tape storage stage. The data placement optimization stage determines the best placement of the data received from the processor stage base on directory frequency statistics, and sends this forward to the tape storage stage so that a CD-ROM can be mastered wherein the seek time for data retrieval and the seek distances that must be travelled on the CD-ROM disc between the retrieval of data on different locations on the disc are minimized. Data replication is also to minimize retrieval distances and time.

6 Claims, 3 Drawing Sheets

⟹

METHOD FOR THE ORGANIZATION OF DATA ON A CD-ROM

BACKGROUND OF THE INVENTION

1. Field of the Invention

This disclosure describes a data organization for CD-ROM disks that uses a symmetric structure, replication scheme, and frequency-based file placement techniques to improve CD-ROM access response time.

2. Description of Related Art

Digital record discs for recording information signals such as digitized audio signals, video or image signals have become quite common. Such digital record disks, e.g., so-called CDs (Compact Disks) have recently become used as ROM (Read Only Memory) devices for computers, so-called CD-ROMs.

On a CD, digital data intended for high density recording is recorded in the form of a spiral bit string on one side thereof and reproduced through reading the bit string by means of pickup means such as an optical pickup using laser beams. The optical pickup of the record disc reproducing apparatus follows the bit string by means of a tracking control system. Geometrically, a CD is 12 cm in diameter and 1.2 mm in thickness. Structurally, a CD is a transparent disk made of synthetic resin and covered with a metal thin film with circularly arrayed pits. These pits represent digital data as obtained by pulse-code-modulating (PCM) the analog acoustic information as picked up. The disk is rotated at a rotating speed in the range from approximately 500 to 200 rpm. A CLV (constant linear velocity) system is used for driving the disk. For playing back data from the disk, an optical pick-up (involving a semiconductor laser, a photo-electric conversion element, and the like) is linearly moved from the inner peripheral side to the outer peripheral side of the disk. A tracking system is used for moving the pick-up. A disk with a 1.6 $\mu$m track pitch is capable of storing a great amount of information.

Thus, a great amount of data is recorded on the disk. The particular disk player used with this disk must search for the intended data from the large amount of data at the highest possible speed. The search function is therefore an essential feature of the disk player.

The CD player was originally developed to playback musical data. The large memory capacity of the CD, however, provides the new use of the CD as a CD-ROM reproduction apparatus. In this system, the CD is used as a ROM or a read only recording medium. Many types of digital data can be stored in the memory area typically used for storing audio data in conventional CD players. To record and reproduce the digital data, the CD-ROM reproduction apparatus employs a conventional record/playback format. Additionally, a new format is also used as described below.

In CD playback systems, analog audio signals of two channels (L and R) are sampled at 44.1 kHz. The sampled data is digitized and recorded onto the CD as 16-bit digital audio data. In CD-ROM reproduction systems, on the other hand, the 16-bit digital audio data of both channels is divided into two pieces of data, each including 8 bits (one byte data). The digital data is stored as a data unit (one block) of 2352 bytes. One block of data includes a sync pattern for checking the start of each block (12 bytes) and, a header address as the address data of the block (every 1/75 sec.), (r bytes), data for user (2048 bytes=2 k bytes), and data for data error detection and correction (mode I) or data for user (mode II) (288 bytes).

Mode I is used when data error cannot be corrected by the parity correction for both channels C1 and C2 in the audio data playback format. If Mode I is used, the error rate can be improved up to $10^{-12}$. This low error rate enables the CD to be used as the recording medium for a computer.

Mode II allows the operator to use the memory area of 288 bytes. When Mode II is used, the error rate is $10^{-9}$ at most, but the amount of usable data in one block is increased to:

$$2048+288=2336 \ bytes.$$

One block of data is reproduced every 1/75 sec. In Mode I, this is 2K bytes of data per block. The data transfer rate of the CD-ROM reproduction system is $2K \times 75 = 150K$ bytes/sec.

Therefore, in the case of the disk which is used in the CD-ROM reproduction system and has a memory capacity of the data providing one-hour continuous playing on each side, the data recorded therein is $$150K \ bytes \times 60 \times 60 = 540M \ bytes.$$

The memory capacity of the CD amounts to that of normal floppy disks of 500 to 1000 or 270,000 documents each containing 200 letters written therein. In this respect, the CD-ROM disk is a data recording medium featuring a low error rate and a tremendously large storage capacity.

The CD-ROM disk is a data recording medium. To process the data recorded, therefore, a host system or a host computer is required. In use, an operator operates a keyboard of the host computer, to cause the host computer to send a command to the CD-ROM reproduction apparatus. In response to the command, the reproduction apparatus searches for the address of the desired data. Following the search, the reproduction apparatus transfers the data specified by the searched address, back to the host computer.

Because CD-ROM reproduction apparatuses are used as a data memory apparatus, high speed data access is a desirable performance feature.

Some approaches to data access of CD-ROMs are described in U.S. Pat. No. 4,937,803 issued Jun. 26, 1990 to Nakane entitled "TRACK ACQUISITION APPARATUS AND METHOD WITH SPECIFIED VELOCITY PATTERN" which discloses data reading device for use in a disk player including a pickup device for reading data from a disk, a pickup transfer motor for moving the pickup across the disk in a radial direction in response to a speed control signal, a pickup transfer speed detector for detecting the radial speed of the pickup and generating a speed signal representative of the speed, a target position signal generator for generating a position signal corresponding to a desired radial position on the disc, a microcomputer for calculating the location of the pickup with respect to the disc and generating a location signal corresponding to the location, a comparator for generating a distance signal representing the distance between the location of the pickup and the desired position using the position signal and the location signal, nonlinear attenuator for attenuating the speed signal in a nonlinear manner based upon the value of the speed signal and a pickup drive circuit for generating the speed control signal from the distance signal and the attenuated speed signal and applying the speed control signal to the pickup transfer motor for moving the pickup.

In U.S. Pat. No. 4,949,323 issued Aug. 14, 1990, to Yoshida entitled "DISK REPRODUCTION APPARATUS AND METHOD FOR HIGH SPEED ACCESSING OF DESIRED INFORMATION DATA BY CHECKING ADDRESS DATA" a system is disclosed wherein, when receiving address data of a target position from a host computer, a control unit reads the present address data of a pick-up using a subcode Q detector or a header detector. The control unit computes a difference between the present address data as read out and the address data of the preceding frame (one block) already read out and stored in RAM. The control unit then checks if the difference is within a preset value. If it is not, the control unit computes a difference between the address data at the target position as specified by the host computer and the present address. The control unit then checks to see if the difference is within a preset value. If it is, the present address data is correct it is used in the data access operation.

SUMMARY OF THE INVENTION

Disk seek time is the major factor in CD-ROM disk access response time since the disk head seek time of ⅓ the distance of the CD-ROM disc ranges from 380 ms to 60 ms while the average rotational latency ranges from 56 ms to 150 ms. Seek time reduction is particularly important in Multimedia applications because of the continuity of media. For example, one second delay of a seek across all tracks to fetch another audio or video clip is a serious performance impairment in Multimedia systems.

An object of the present invention is to produce a data organization method for CD-ROM disks.

Another object of the present invention is to provide a data organization method for CD-ROM disks that employs a symmetric structure for directory, path and file information placement.

Still another object of the present invention is to provide a data organization method for CD-ROM disks that incorporates frequency based data placement.

A further object of the present invention is to provide a data organization method for CD-ROM disks that employs data replication.

DESCRIPTION OF THE PREFERRED EMBODIMENT

An embodiment of a new data placement organization method that reduces the average seek time and the probability of maximum distance seeks of CD-ROM disks by a combination of symmetric structuring, frequency-based data placement, and data replication is described. These techniques take into consideration two CD-ROM properties. First CD-ROM disks are read only. Application authoring and editing usually take place on a writable hard disk, then the resultant disk composition is transferred to manufacturers for CD-ROM recording (mastering). Therefore, the overhead associated with file system reorganization is absorbed during the mastering procedure. Secondly, the 600 MB capacity of CD-ROM disks is quite large for many applications, and none of the unused portion can be used again. Therefore, free space on disks can be used for data duplication without penalty. If desired, for response time critical applications, some capacity can be sacrificed for performance improvement purposes.

Figure 1:
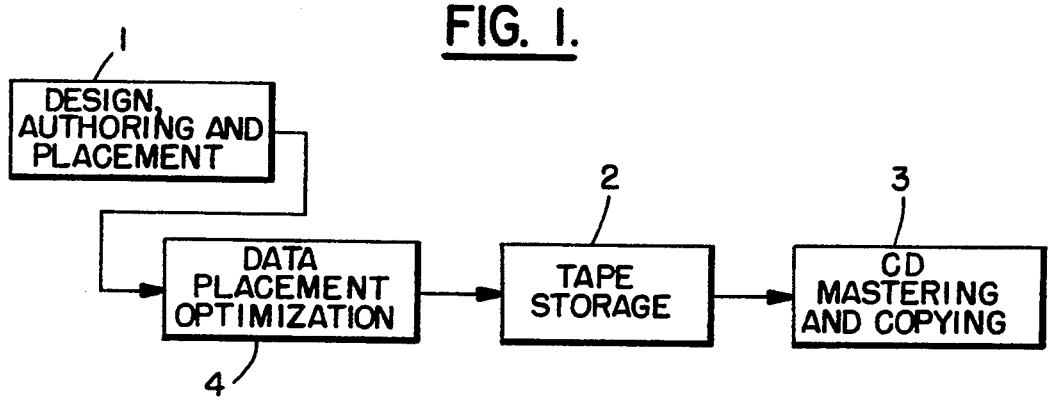
FIG. 1 is a schematic block diagram of a system for processing data and placing it on a CD-ROM.

FIG. 1 is a schematic illustration of the technique for fabricating a CD-ROM, including the data placement organization stage of the present invention.

In the first stage 1, the data is designed, authored and prepared on a data processor or personal computer and stored on the hard disk memory. Normally in conventional fabrication systems, the placement strategy for the data on the hard disk is dependent on the ability of the author. The data is transferred from the hard disk temporary storage of processor stage 1 onto tape storage stage 2 or even optical disk storage.

The data on the tape storage stage 2 is used as input to a CD-ROM mastering stage 3 wherein, based on the content of the tape, holes are burned in a master CD mold which is used to press a large quantity of CDs.

According to the principles of the present invention, a data placement optimization stage 4 is provided between the processor storage stage 1 and the tape storage 2.

The data placement optimization stage 4 determines the best placement of the data received from the processor stage 1 based on directory frequency statistics, and sends this forward to the tape stage 2 so that a CD-ROM can be mastered wherein the seek time for data retrieval and the seek distances that must be travelled on the CD-ROM disc between the retrieval of data on different locations on the disc are minimized.

Figure 2:
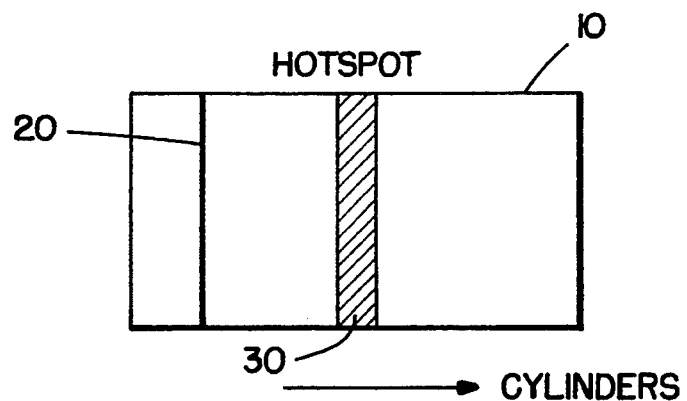
FIG. 2 is a representation of the manner in which most frequently used data is disposed on a CD-ROM in accordance with the principles of the present invention.

Large seek time and large seek distances are related to the fact that the data to be stored have uneven access probabilities. A feature of the data organization method of the present invention for overcoming the uneven access probabilities for data to be stored is a technique for the allocation of the most frequently accessed areas into one designated area in the middle of all the other data on the disk. Referring to FIG. 2, a section 10 of the surface of a CD-ROM is illustrated with a typical data track 20 disposed thereon. The data normally stored on a CD-ROM includes file system structures which contain frequently accessed data for directory, path and file allocation information. The data for this information is stored at the center tracks 30 of the disk as shown in FIG. 2. The region 30 occupied by the tracks containing the directory path and file allocation information will be referred to hereinafter as the "hot spot".

The method of the present invention includes another data organization feature wherein data placement is frequency based. After the directory, path and file allocation data is stored in the middle tracks of the disk, frequently accessed data are placed proximate to the middle tracks to statistically reduce the seek distances.

Figure 3A:
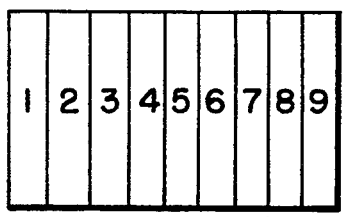
FIGS. 3A, 3B and 4A, 4B are representations of the manner in which data banks are disposed on a CD-ROM in accordance with the access frequency according to the principles of the present invention.
Figure 3B:
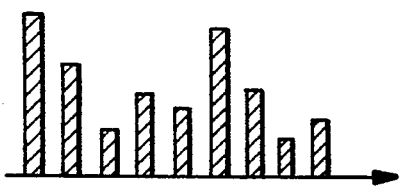

Referring to FIGS. 3A and 3B, in FIG. 3A a disk segment 16 is illustrated with the data located in track regions designated 1, 2, 3, 4, 5, 6, 7, 8 and 9, with the "hot spot" data being in Track 1. FIG. 3B illustrates the frequency at which the various data in the track regions 1 through 9 are accessed. The frequency values depicted in FIG. 3B use directory based statistics because to collect statistics for files is difficult since the number of files stored on a CD-ROM may be overwhelmingly large, therefore a directory is a better unit of reallocation than a file. The access frequency values are for the directories stored on the disk depicted by the heights of the bar graph for regions 1 through 9.

Figure 4A:
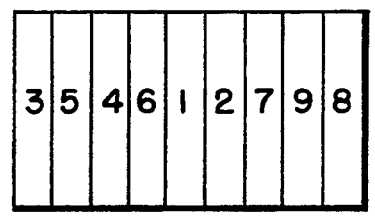
Figure 4B:
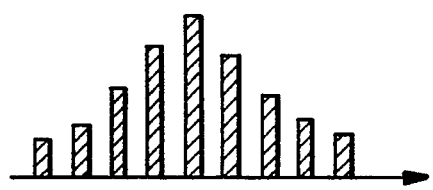

To reorganize the data on the disk on the basis of frequency, a simple algorithm of the type known in the art as "greedy" algorithm may be employed. The frequency based reallocation is illustrated in FIGS. 4A and 4B. In FIG. 4B, the highest frequency is that of the "hot spot" track region 1, which is located in the center middle of the disk as shown in FIG. 4A. The rest of the allocations are sorted according to access frequency statistics as illustrated with the most frequently accessed directories placed next to the centered "hot spot" and the next frequently used directories are placed to whichever side of center has more free space. Thus, data regions 6 and 2, being the next most frequently used directories, are allocated to the immediate left and right of the center "hot spot" allocation. The remaining directories are likewise allocated according to access frequency into the left directory set and the right director set as illustrated in FIGS. 4A and 4B.

The collection of the frequency statistics for the reallocation technique of the present invention can be carried out on-line or off-line depending on the degree of accuracy desired.

Figure 6:
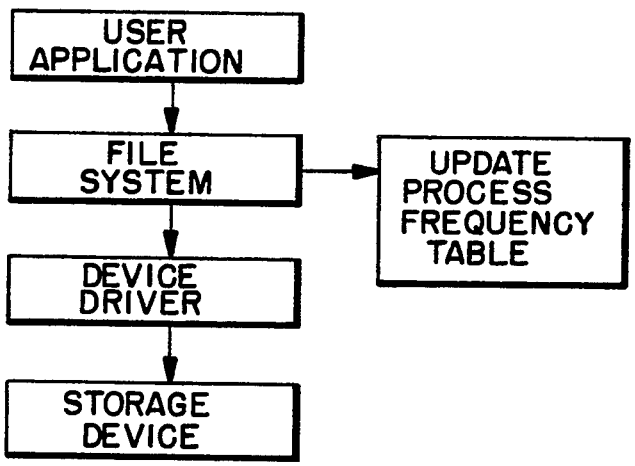
FIG. 6 is a schematic illustration of the flow chart for an on-line statistics collection technique which can be employed in the present invention.

Referring to FIG. 6, a flow chart for the on-line technique is illustrated. First an access frequency table is entered and stored in the storage device. The access frequency table is collected data based on the frequency of known user requests. Then the user application issues disk I/O requests to the file system of the processor operating system software. Normally, in conventional processor systems, the file system issues I/O requests to the device driver software which in turn accesses the storage device.

In the present invention the file system feeds, on-line, the "update process frequency table" step wherein the file system is modified to intercept all requests generated by the user applications to access CD-ROM data. The access frequency table is updated accordingly.

The new file system then continues to issue necessary I/O requests to the disk device driver which in turn accesses the storage device.

Figure 7:
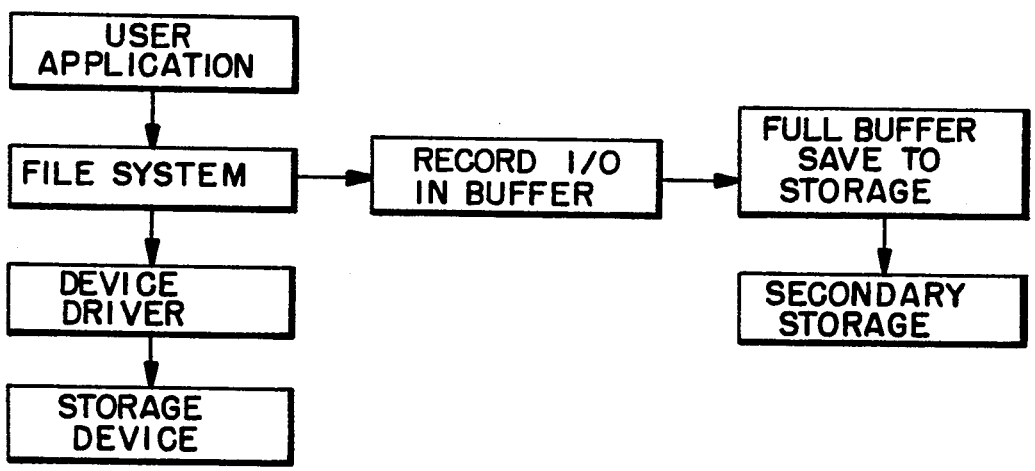
FIG. 7 is a schematic illustration of the flow chart for an off-line statistics collection technique which can be employed in the present invention.

In the off-line technique, it is necessary to employ buffering storage space. In FIG. 7, the conventional steps of going from user application to file system to file driver to storage is shown. However, a buffer storage means is provided and all the related I/O requests are dumped into the buffer. The buffer status is checked, and when the buffer is full, the contents are sent to a secondary storage device such as a disk or tape.

The history of the I/O requests are scanned to obtain the access frequencies as well as the transition probabilities of the directories and files.

An important feature of the present invention is the replication scheme. As previously stated, the CD-ROM has a very high memory capacity and normally has free space not used for data storage. In the method of the present invention, free space on the CD-ROM is allocated for data replication. Referring to FIGS. 5A, 5B, 5C, 5D and 5E a schematic diagram is provided illustrating a data replication or duplication sequence.

Figure 5A:
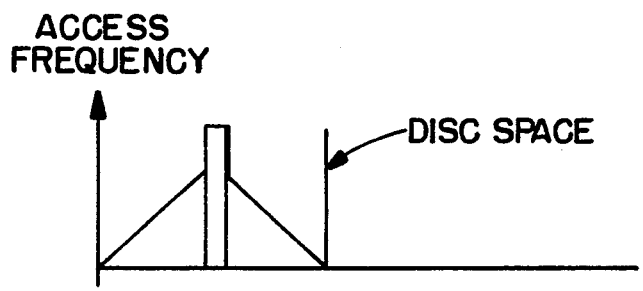
FIGS. 5A–5E illustrate the manner in which data is replicated on a CD-ROM in accordance with the principles of the present invention.
Figure 5B:
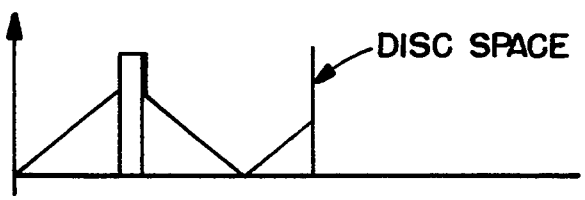

In FIG. 5A, the access frequencies of the original stored directories are plotted versus the disk space. The curves show the "hot spot" region 1 and the remaining directories allocated on the left and right directory sets. The access frequencies of the directories stored furthest from its centered "hot spot" are shown approaching zero. In second replication case shown in FIG. 5B, the amount of free space on the disk is less than the amount of space occupied by the left directory set and data from the left directory set are duplicated starting from the first cylinder until the free space is used up.

Figure 5C:
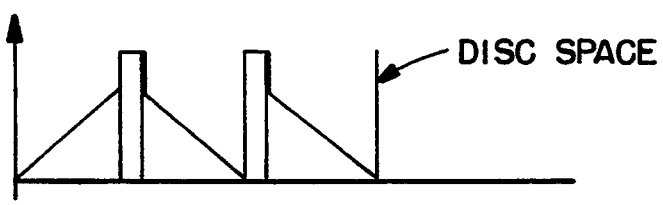
Figure 5D:
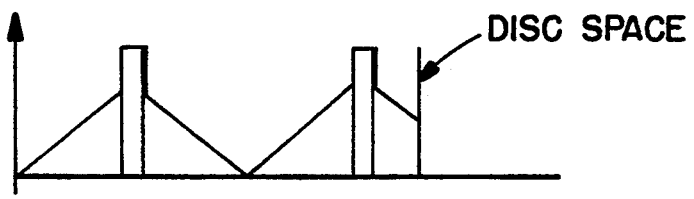
Figure 5E:
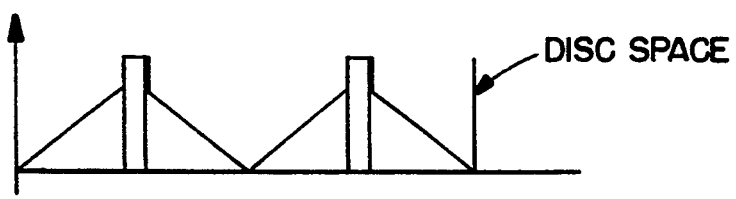

In the second replication case illustrated in FIG. 5C, the amount of free space is just sufficient for storing both the left directory set and the "hot spot". The "hot spot" is duplicated first, and the sequence of the duplication of the left directory is reversed or flipped, going from the "hot spot". In the third case depicted in FIG. 5D there is enough free space for some of the right directory set, so this duplication sequence reverts back to the original sequence wherein this left directory set, the "hot spot" and part of the right directory set is duplicated in that order. FIG. 5E illustrates the case where there is sufficient disk space for one full replication of the data shown in FIG. 5A.

It should be noted that in the second case of FIG. 5C the flip of the orientation of the duplication of the left directory set is used to reduce the probability of moving disk heads to the end cylinders, which increases the average seek distance. When the access probability of the "hot spot" is high, the flip of the duplication is more efficient.

The following section provides examples that illustrate the seek distance reduction and the duplication sequence. A random sequence of accesses of 5,000 samples generated was tested on the stages of data duplication. It is assumed in the example that all data are of the same size.

The first example shows the average seek distance for evenly distributed access probabilities and straightforward duplications.

| | Data Item Probability | | | | | | | | |
|---|---|---|---|---|---|---|---|---|---|
| data | 1 | 2 | 3 | 4 | 5 | 6 | 7 | 8 | 9 |
| probability | 0.111 | 0.111 | 0.111 | 0.111 | 0.111 | 0.111 | 0.111 | 0.111 | 0.111 |

| Simulation Results of Average Seek Distance | |
|---|---|
| avg seek dist | duplication sequence |
| 2.9740 | 1 2 3 4 5 6 7 8 9 |
| 2.7634 | 1 2 3 4 5 6 7 8 9 1 |
| 2.6474 | 1 2 3 4 5 6 7 8 9 1 2 |
| 2.5662 | 1 2 3 4 5 6 7 8 9 1 2 3 |
| 2.5250 | 1 2 3 4 5 6 7 8 9 1 2 3 4 |
| 2.4854 | 1 2 3 4 5 6 7 8 9 1 2 3 4 5 |
| 2.4454 | 1 2 3 4 5 6 7 8 9 1 2 3 4 5 6 |

|   |   |
|---|---|
| -continued | |
| 2.4370 | 1 2 3 4 5 6 7 8 9 1 2 3 4 5 6 7 |
| 1.4042 | 1 2 3 4 5 6 7 8 9 1 2 3 4 5 6 7 8 |
| 1.3962 | 1 2 3 4 5 6 7 8 9 1 2 3 4 5 6 7 8 9 |

In this next example, it is assumed all data are of the same size with uneven probability densities, and 5 is the hot spot.

| Data Item Probability | | | | | | | | | |
|---|---|---|---|---|---|---|---|---|---|
| data | 1 | 2 | 3 | 4 | 5 | 6 | 7 | 8 | 9 |
| probability | 0.036 | 0.071 | 0.107 | 0.143 | 0.286 | 0.143 | 0.107 | 0.071 | 0.036 |

| Simulation Results of Average Seek Distance | | |
|---|---|---|
| avg seek dist | duplication sequence | |
| 3.3882 | 5 1 9 2 8 3 7 4 6 | |
| 3.0386 | 5 1 6 8 2 7 4 3 9 | |
| 2.6194 | 5 4 6 3 7 2 8 1 9 | |
| 2.1272 | 1 2 3 4 5 6 7 8 9 | |
| 2.0850 | 1 2 3 4 5 6 7 8 9 1 | |
| 2.0774 | 1 2 3 4 5 6 7 8 9 1 2 | |
| 2.0850 | 1 2 3 4 5 6 7 8 9 1 2 3 | |
| 2.0994 | 1 2 3 4 5 6 7 8 9 1 2 3 4 | |
| 2.0716 | 1 2 3 4 5 6 7 8 9 5 4 3 2 1 | <—flip of sequence |
| 2.0658 | 1 2 3 4 5 6 7 8 9 1 2 3 4 5 6 | |
| 2.0318 | 1 2 3 4 5 6 7 8 9 1 2 3 4 5 6 7 | |
| 1.9974 | 1 2 3 4 5 6 7 8 9 1 2 3 4 5 6 7 8 | |

Note that a CD-ROM drive uses a constant linear velocity (CLV) approach, wherein the capacity of a track varies at different radial positions. Therefore, the aforementioned figures are only conceptual diagrams, and not drawn to scale.

To further improve the performance of the present invention, frequently visited files are grouped in clusters to reduce the average seek distance. Multiple copies of the hot spot are used to further reduce the seek distance. Given a request, CD-ROM drives can always select one copy of requested data that is closest to the current head location.

The average disk seek distance for a N-cylinder fixed disk is ⅓*N under the assumption that the cylinder numbers accessed are independently, identically, and uniformly distributed over cylinder 1 to N. However, file system structures and uneven access probabilities to files invalidate the assumption. For example, hot spots with high access probability are often found in the FAT (File Allocation Table) and Root directory regions under DOS with a FAT-based file system. Because FAT and root directory always reside on the beginning cylinder of the disk, analysis shows that 25% of FAT+root directory accesses increases the average seek distance by about 12.5%.

As previously discussed, an improvement of the data organization method is the symmetric structure around hot spots. If a disk head rests on cylinder N/2 after each seek operation, then average seek distance drops from N/3 to N/4.

Still another improvement that was discussed is to adopt a frequency-based data placement policy that places frequently-used data closer to the center hot spot such that the average seek distance is further reduced. Though reorganizing data on a hard disk according to a decreasing order of data access frequency is very time-consuming, it can be done when transferring the content on the disk to a tape.

Figure 8:
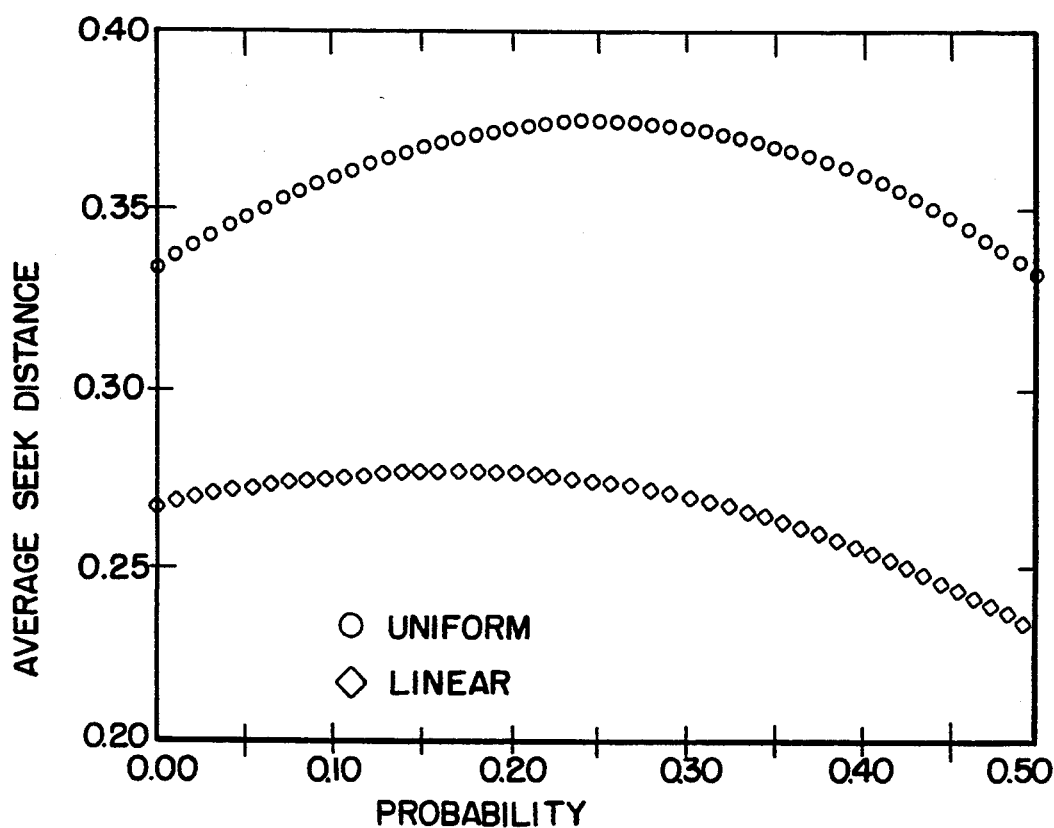
FIG. 8 is an illustration of curves, indicating the improved performance achieved using the principles of the present invention.

FIG. 8 illustrates the advantage of a frequency-based placement policy, where the average seek distance versus hot spot access probability for two types of data arrangements according to their access frequency pattern: random and strictly decreasing.

A still further improvement previously discussed in the seek time performance is the duplication of the hot spot and data. If at least half of the data is duplicated, the probability of a seek of the maximum distance is almost cut in half. The average seek reduction depends on the data placement and the access probabilities.

Conventional CAV (Constant Angular Velocity) disks lay out data in concentric tracks of equal capacity, and the outermost tracks have lower recording densities than the innermost tracks. Therefore, the latency of reading the outermost track is higher than that of reading the innermost track. The same amount of data occupies fewer tracks as the location moves away from the center of the disk.

A direct consequence of the CLV approach is that average seek time and rotational latency depend on the radial location of data. Seek distance across a fixed number of sectors decreases as the number of sectors in a track increases; however, the average rotational latency increases. For example, if a data band is moved from radius RO to R1, and the distance of a intra-band seek is s and the average rotational latency r at RO. The new seek distance at R1 will be s*RO/R1, and new latency r*R1/RO. Therefore, the center location for hot spots of a whole disk data set must be adjusted such that the sums of seek time and rotational latency to both end tracks are equal. Also, the selection of a nearest copy of data must be based on the same principle.

What has been described is a method that provides an effective and systematic data organization for Multimedia CD-ROM disks. Three features, including a symmetric structure, frequency-based placement policy, and systematic replication scheme, significantly reduce disk access response time to CD-ROM data. In the aforementioned examples, the improvement can be more than 40%. Each of the features described individually improves peek performance, and any combination of features can be implemented. The same methodology applies not only to CLV disks, but also to CAV disks. No overhead is imposed on users, and the one-time overhead to authors is absorbed in the mastering procedure. The data reorganization is transparent to users and it is independent of file systems.

The previous discussion described the data organization techniques of the present invention with the directory being the basic unit. The method of the present invention can also be used for data placement within a directory where each basic unit is a file.

Also, if the off-line technique of statistic collection as illustrated in FIG. 7 is used, the transition probabilities of moving from one item to another can be calculated. Based on the calculated transition probabilities, standard optimization can be used to determine the best data organization.

In the case of limited computing power, a "greedy" algorithm can be used to minimize the expression $\Sigma_i \delta_i \Sigma_j P_{ij} d(\Pi(i), \Pi(j))$ where $\delta_i$ is the access frequency.

Frequency-based file placement and symmetric structures are heuristics for average seek distance minimization where there are only steady state probabilities of disk head location. The basic block unit for statistics collection is a directory. The placement heuristics to take advantage of two-point statistics, i.e., the state transition probabilities are generalized so as to be applied to files as well as directories. Also, implementation issues including an off-line statistics collection methodology are described in the following discussion.

A Markovian process is used to model the access pattern. "State" is used to represent the location of disk read/write head on the disk recording platter. Each state can be a single file or a single directory. It is assumed that the disk head movement depends only on the current state. With loss of generality, the problem is formulated as follows:

Given states 1 to N, and
$P_{ij}$: Prob {transition from state i to state j}, and
$d(i,j) = |i,j|$: Function of seek distance.
Find a permutation $\Pi$ to minimize $$\sum_i S_i \sum_j P_{ij} d(\Pi(i), \Pi(j)),$$

where $s_i$ is the steady state probability of state i.

Since the optimal solution requires trials on the order of N!, which is not tractable for large problems, the following greedy algorithm is employed:

1. Find $S_i$ from the following balance equation.

$$P^T s = s$$

2. The objective function can be written as $$\sum_i \sum_j S_i P_{ij} d(\Pi(i), \Pi(j))$$

Then sort $s_i P_{ij}$ into a descending order.

3. Take the next largest $s_x P_{xy}$, and do the following.
   If neither of them has been processed, put x next to y and form a new sequence. $\lambda(y)$ is used to represent this subsequence, and consequently $\lambda(x) = \lambda(y)$.
   If y has been seen, but not x, concatenate x to either end of $\lambda(y)$ such that $$S_x \sum_{j \in \lambda(y)} P_{xj} d(\Pi(x), \Pi(j)) + \sum_{i \in \lambda(y)} S_i P_{ix} d(\Pi(i), \Pi(x)) \text{ is minimize}$$

If both x and y have been processed and $\lambda(x) \neq \lambda(y)$, concatenate $\lambda(x)$ and $\lambda(y)$ into $\lambda(x,y)$ in one of the four ways:

$$\lambda(x) \oplus \lambda(y), \lambda^R(x) \oplus \lambda(y), \lambda(x) \oplus \lambda^R(y), \lambda^R(x) \oplus \lambda^R(y)s$$

such that $\sum_{ij \in \lambda(x,y)} S_i P_{ij} d(\Pi(i), \Pi(j))$ is minimized where $\lambda^R(x)$ is the reversed sequence of $\lambda(x)$.
If both x and y have been processed and $\lambda(x) = \lambda(y)$, do nothing.

4. Continue with step 3 until we have a sequence containing all the items. Step 3 effectively states that, starting with the most likely transition $x \rightarrow y$, put s,y into the existing sequences such that the average seek distance is minimized, but only try to concatenate existing subsequences, and x,y.

The algorithm places directories according to transition probabilities. This algorithm can also apply to files inside a single directory. Also, the same algorithm can be applied to the situation where there are only access frequencies instead of transition probabilities, i.e., $P_{ij} = s_j$. Then this algorithm yields a frequency-based placement with a symmetric structure.

This algorithm finds only approximate solutions, but its complexity is only $O(N^2 \log N)$. When the size N is small, exhausted search can be used to find the optimal permutation.

Statistics collection for transition probability requires a large amount of CPU cycles and memory. Offline trace collection facility could be used to gather disk I/O activities over a long period of time to yield a more reliable statistics. A more realistic function of d(i,j) can be adopted to reflect the difference in either directory or file sizes.

While the invention has been particularly shown and described with respect to a preferred embodiment thereof, it will be understood by those skilled in the art that changes in form and details may be made therein without departing from the scope and spirit of the invention.

We claim:

1. A method for placing data on a compact disk of the type wherein data is stored on the disk surface in concentric tracks of equal capacity comprising the steps of:
   Step 1) compiling in a first storage means a quantity of data in the form of data files arranged in directories including path data and data specifying the allocation of the files within the directories,
   Step 2) transferring said compiled data from said first storage means to a data placement optimization stage,
   Step 3) determining, in said data optimization stage, placement assignments of said data on said concentric tracks of said compact disk based on directory frequency statistics including the frequency at which said directories of said data are user accessed and rearranging said data in accordance with said placement assignments,
   assigning a quantity of most frequently accessed directory data, path data and file allocation data to the track locations at the center of said compact disk substantially midway in distance between the first and last track locations on said compact disk, said track locations at said center of said compact disk being referred to herein as the hot spot,
   assigning a selected amount of the next most frequently user accessed data to track locations proximate to one side of said hot spot tracks and the step of assigning a selected amount of the still next most frequently accessed data to track locations on the other side of said hot spot tracks,
   Step 4) transferring said data rearranged in accordance with said placement assignments from said data optimization stage to a second storage means,
   Step 5) and transferring said rearranged data from said second storage means to a compact disk mastering and copying means for placing said data on said compact disk in accordance with said placement assignments.

2. A method for placing data on the tracks of a compact disk according to claim 1 wherein said step 3 still further includes the steps of assigning the remaining of said data compiled in Step 1 and placement optimized in Step 3 to tracks of said compact disk, said remaining data of said quantity of data of Step 1 being assigned to tracks on successive alternate sides of said hot spot at distances from said hot spot related to the user access frequencies of said data.

3. A method for placing data on the tracks of a compact disk according to claim 2 wherein said step 3 further includes the step of determining whether available tracks remain on said disk that do not have data assigned thereto after said quantity of compiled data has been completely assigned to tracks, and the step of again assigning said quantity of compiled data to said remaining available tracks to replicate said assignment of said compiled data on said compact disk.

4. A method for placing data on the tracks of a compact disk according to claim 3 wherein, in step 3, there are a total of N tracks on said compact disk, wherein said quantity of compiled data has been assigned to M tracks where M is a number less than N, wherein said available remaining tracks are A in number where $A=N-M$, and wherein A is a number less than M/2 and wherein said quantity of compiled data again assigned to said A remaining available tracks are assigned beginning with the least frequently accessed data being assigned to the next tracks of said A tracks adjacent to said M tracks.

5. A method for placing data on the tracks of a compact disk according to claim 3 wherein, in step 3, there area total of N tracks on said compact disk, wherein said quantity of compiled data has been assigned to M tracks where M is a number less than N, wherein said available remaining tracks are A in number where $A=N-M$, and wherein A is a number between M/2 and M and wherein said quantity of compiled data again assigned to said A remaining available tracks are assigned beginning with the least frequently accessed data being assigned to the next of said A tracks adjacent to said M tracks.

6. A method for placing data on the tracks of a compact disk according to claim 3 wherein, in step 1, there are a total of N tracks on said compact disk, wherein said quantity of compiled data has been assigned to M tracks where M is a number less than N, wherein said available remaining tracks are A in number where $A=N-M$, and wherein A is a number equal to M/2 and wherein said quantity of compiled data again assigned to said A remaining available tracks are assigned beginning with the most frequently accessed hot spot data being assigned to the next of said A tracks adjacent to said M tracks.

* * * * *